(12) United States Patent
Sato

(10) Patent No.: US 9,900,523 B2
(45) Date of Patent: Feb. 20, 2018

(54) IMAGE PROCESSING APPARATUS WHICH PERFORMS IMAGE PROCESSING ON PHOTOGRAPHIC SUBJECT

(71) Applicant: CASIO COMPUTER CO., LTD., Shibuya-ku, Tokyo (JP)

(72) Inventor: Takeshi Sato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/974,375

(22) Filed: Dec. 18, 2015

(65) Prior Publication Data

US 2016/0219227 A1 Jul. 28, 2016

(30) Foreign Application Priority Data

Jan. 23, 2015 (JP) .................................. 2015-010793

(51) Int. Cl.
*H04N 5/262* (2006.01)
*H04N 5/232* (2006.01)
*G06K 9/00* (2006.01)

(52) U.S. Cl.
CPC ....... *H04N 5/2622* (2013.01); *H04N 5/23219* (2013.01); *H04N 5/23229* (2013.01); *H04N 5/2621* (2013.01)

(58) Field of Classification Search
CPC ............. H04N 5/2602; H04N 5/23219; H04N 5/23229; H04N 5/2621; G06K 9/00

(Continued)

(56) References Cited

U.S. PATENT DOCUMENTS 7,454,134 B2 11/2008 Sato
7,587,083 B2 9/2009 Tabata et al.
(Continued)

FOREIGN PATENT DOCUMENTS

JP 11224327 A 8/1999
JP 2000069277 A 3/2000
(Continued)

OTHER PUBLICATIONS

Japanese Office Action (and English translation thereof) dated Feb. 3, 2016, issued in counterpart Japanese Application No. 2015-010793.

*Primary Examiner* — Tuan Ho
*Assistant Examiner* — Marly Camargo
(74) *Attorney, Agent, or Firm* — Holtz, Holtz & Volek PC

(57) ABSTRACT

First, the position and the size of a target photographic subject such as the face of a person in an original image acquired by image capturing is acquired, and then mask information indicating a relation between a position to be subjected to predetermined image processing in the original image and the strength of the predetermined image processing is generated based on the acquired position and size. Subsequently, a new image is generated by predetermined image processing of a different strength being performed on each position in the original image by use of the generated mask information. In the generation of the new image, for example, one of the original image and a processed image acquired by the predetermined image processing being performed on the original image is combined with the other image by use of transmissivity indicated by the mask information for each pixel.

12 Claims, 7 Drawing Sheets

(58) Field of Classification Search
USPC ......... 348/239, 661, 222.1, 345, 218.1, 213; 382/103, 117, 118, 144, 212, 213, 283, 382/164, 173, 291, 100
See application file for complete search history.

(56) References Cited

U.S. PATENT DOCUMENTS

| | | |
|---|---|---|
| 7,702,149 B2 | 4/2010 | Ohkubo et al. |
| 9,210,318 B2 | 12/2015 | Kunishige |
| 2006/0098970 A1 | 5/2006 | Sato |
| 2006/0274936 A1 | 12/2006 | Ohkubo et al. |
| 2007/0041640 A1* | 2/2007 | Tabata .................... G06T 5/008 382/173 |
| 2008/0013799 A1* | 1/2008 | Steinberg ........... G06K 9/00228 382/118 |
| 2014/0104483 A1 | 4/2014 | Kunishige |

FOREIGN PATENT DOCUMENTS

| | | |
|---|---|---|
| JP | 2004080709 A | 3/2004 |
| JP | 2004303193 A | 10/2004 |
| JP | 2006140594 A | 6/2006 |
| JP | 2006338377 A | 12/2006 |
| JP | 2007065784 A | 3/2007 |
| JP | 2012231200 A | 11/2012 |
| JP | 5156108 B2 | 3/2013 |
| JP | 2013179464 A | 9/2013 |

\* cited by examiner

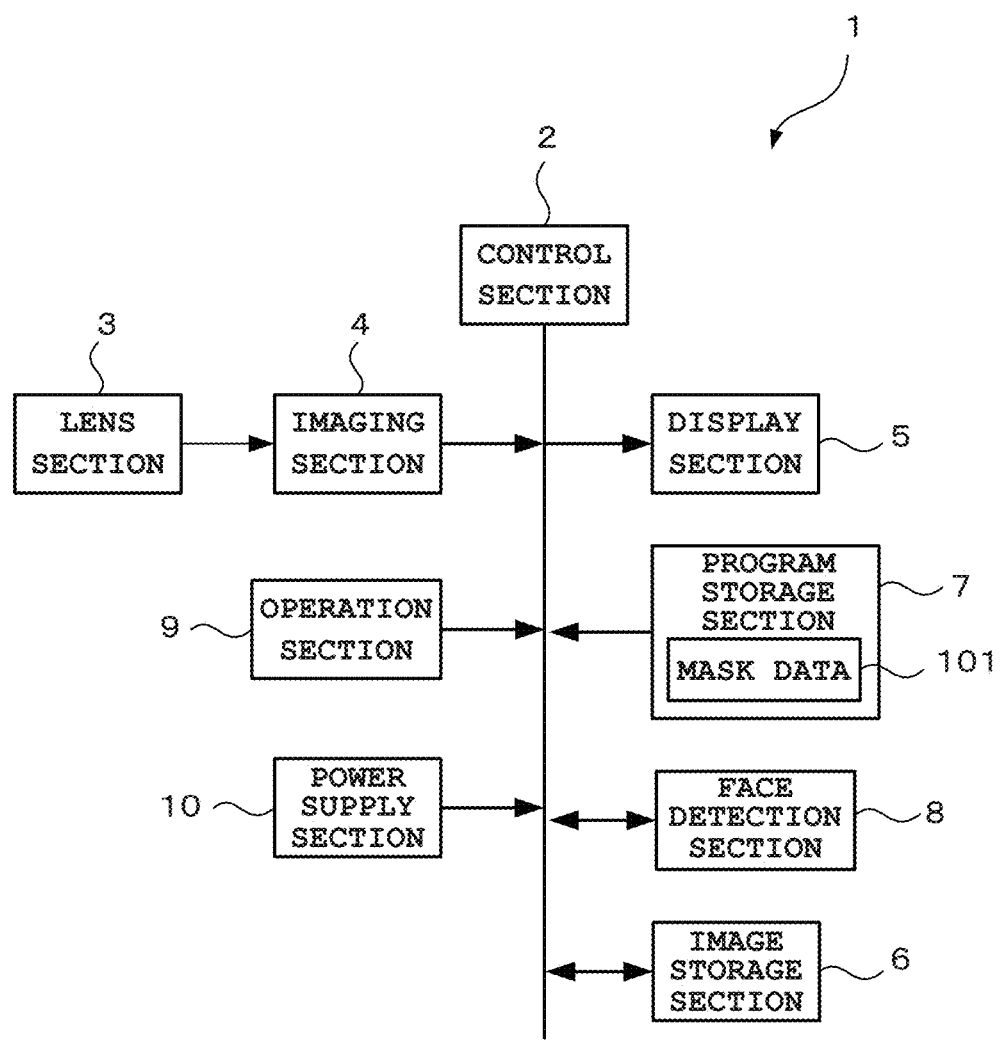

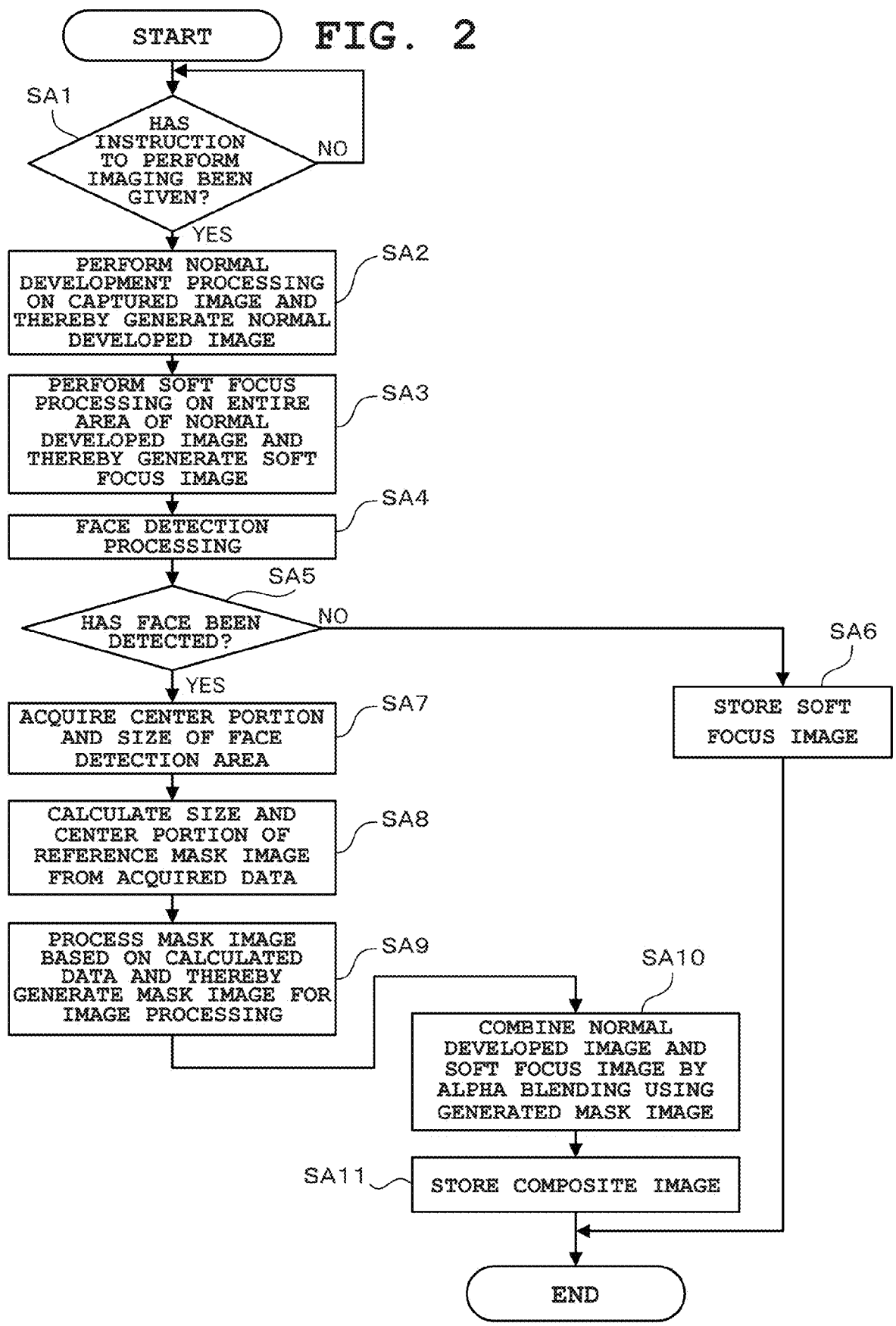

FIG. 4
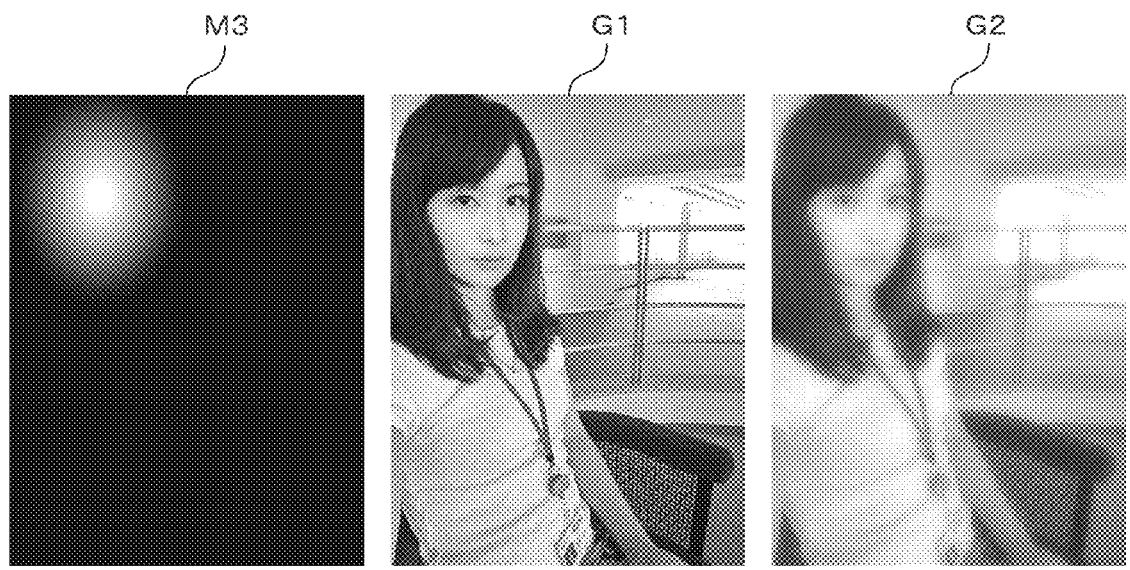
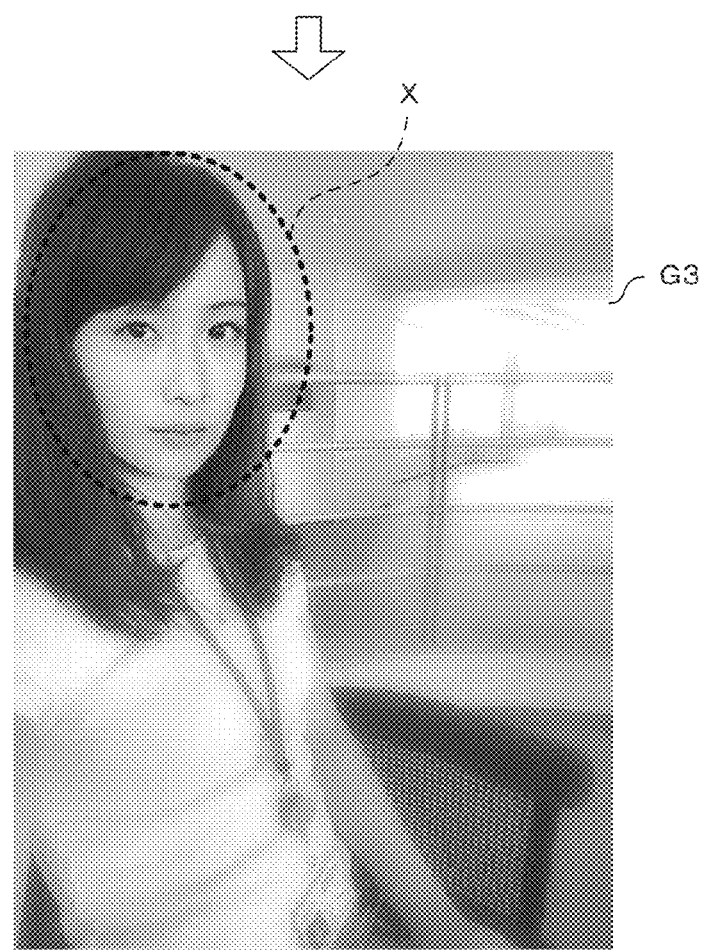

IMAGE PROCESSING APPARATUS WHICH PERFORMS IMAGE PROCESSING ON PHOTOGRAPHIC SUBJECT

CROSS-REFERENCE TO RELATED APPLICATION

This application is based upon and claims the benefit of priority from the prior Japanese Patent Application No. 2015-010793, filed Jan. 23, 2015, the entire contents of which is incorporated herein by reference.

BACKGROUND OF THE INVENTION

1. Field of the Invention

The present invention relates to an image processing apparatus and an image processing method.

2. Description of the Related Art

Conventionally, as a type of image processing that is performed in a digital camera and the like, soft focus processing is known in which a defocusing effect similar to that occurred due to the chromatic aberration and spherical aberration of a dedicated lens is added to an original image so as to create a soft atmosphere. As a technique related to this soft focus processing, for example, Japanese Patent Application Laid-Open (Kokai) Publication No. 2000-069277 discloses a technique in which the face of a person is detected from an original image and processing strength is controlled based on the size of the face so as not to perform the processing uniformly regardless of the contents of the image.

SUMMARY OF THE INVENTION

In accordance with one aspect of the present invention, there is provided an image processing apparatus comprising a CPU that is configured to acquire a position and a size of a target photographic subject in an original image acquired by image capturing; generate mask information indicating a relation between (i) a position to be subjected to predetermined image processing in the original image and (ii) strength of the predetermined image processing, based on the acquired position and the acquired size of the target photographic subject; and generate a new image by performing predetermined image processing of a different strength on each position in the original image by using the generated mask information.

In accordance with another aspect of the present invention, there is provided an image processing apparatus comprising: a CPU that is configured to identify, as a target photographic subject, a photographic subject for which focal adjustment has been made and which is shown in an original image acquired by image capturing; acquire focal information of the identified photographic subject; generate mask information indicating a relation between (i) a position to be subjected to predetermined image processing in the original image and (ii) strength of the predetermined image processing, based on the acquired focal information; and generate a new image by performing predetermined image processing of a different strength on each position in the original image by using the generated mask information.

In accordance with another aspect of the present invention, there is provided an image processing method comprising: acquiring a position and a size of a target photographic subject in an original image acquired by image capturing; generating mask information indicating a relation between (i) a position to be subjected to predetermined image processing in the original image and (ii) strength of the predetermined image processing, based on the acquired position and the acquired size of the target photographic subject; and generating a new image by performing predetermined image processing of a different strength on each position in the original image by using the generated mask information.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 1 is a block diagram showing a digital camera that is common to each embodiment of the present invention:

FIG. 2 is a flowchart of image capture processing in a first embodiment;

FIG. 4 is a diagram showing an example of an image generated by the image capture processing in the first embodiment;

DETAILED DESCRIPTION OF THE PREFERRED EMBODIMENTS

Figure 3A:
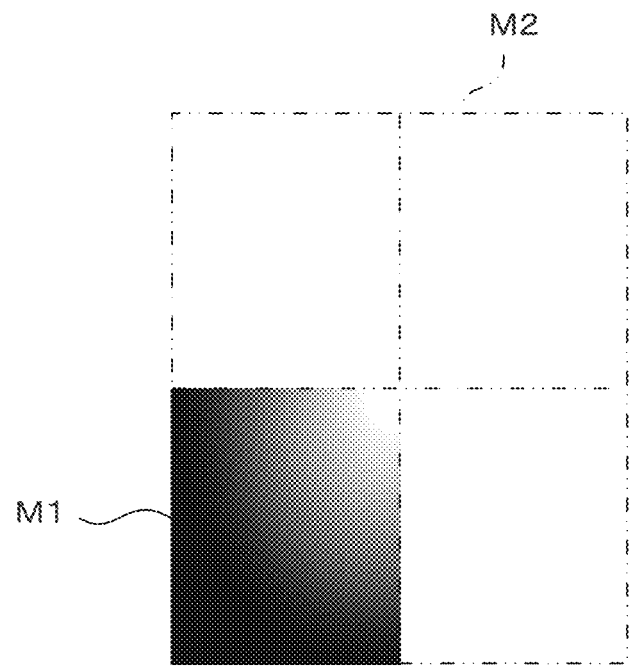
FIG. 3A is a diagram showing a first mask image.

Embodiments of the present invention will hereinafter be described with reference to the drawings.

First Embodiment

First, a first embodiment of the present invention is described. FIG. 1 is a block diagram showing the electrical structure of a digital camera 1 that is an example of an image processing apparatus according to the first embodiment and a second embodiment described later.

This digital camera 1 includes a control section 2, a lens section 3, an imaging section 4, a display section 5, an image storage section 6, a program storage section 7, a face detection section 8, an operation section 9, and a power supply section 10, as shown in FIG. 1.

The control section 2 includes a CPU (Central Processing twit), its peripheral circuits, an internal working memory such as a RAM (Random Access Memory), and an image processing circuit. This control section 2 controls each section of the digital camera 1, and performs various image processing described later.

The lens section 3 is constituted by a lens group including a focus lens and a zoom lens, a motor that drives the lens group, an aperture, and an actuator that adjusts the opening of the aperture by driving the aperture to be opened or closed.

The imaging section 4 includes an image sensor of a CCD (Charge Coupled Device) or CMOS (Complementary Metal Oxide Semiconductor) type, and an AFE (Analog Front End) that performs predetermined analog processing on an imaging signal outputted from the image sensor and converts it into a digital signal. When the digital camera 1 is in an imaging mode, the imaging section 4 sequentially captures a photographic subject at a predetermined frame rate via the lens group of the lens section 3, and supplies the image data (imaging data) of the photographic subject to the control section 2.

The image data supplied to the control section 2 is then supplied to the display section 5, and displayed on the display section 5 as a live view image.

Image data supplied to the control section 2 from the imaging section 4 in image capturing performed in response to an imaging execution instruction given using the operation section 9 described later is subjected to development processing including gamma correction, white balance adjustment, generation of RGB color component data for each pixel, YUV conversion, and the like, and compressed in the JPEG (Joint Photographic Experts Group) format. Subsequently, various attribution information is added to the compressed image data. Then, the image data is stored in the image storage section 6 as a still image file that meets the Exif (Exchangeable Image File Format) standard.

The image storage section 6 includes, for example, a flash memory embedded in the digital camera 1, various memory cards detachably attached to the digital camera 1, and a card interface that enables the input and output of data to and from a memory card.

When the digital camera 1 is in a playback mode, image data stored as a still image file in the image storage section 6 is read out by the control section 2 as necessary, and expanded. Then, the image data is supplied to the display section 5 and displayed on the screen.

The display section 5 includes a color liquid crystal display panel and a display driving circuit that drives the color liquid crystal display panel in accordance with image data and the like supplied from the control section 2. As described above, in the imaging mode, the display section 5 displays a subject image by live view display. In the playback mode, the display section 5 displays captured images constituted by image data stored as still image files in the image storage section 6.

The program storage section 7 includes, for example, a non-volatile memory such as a ROM (Read Only Memory) or a flash memory where stored data can be rewritten any time. In the program storage section 7, a program for causing the control section 2 to perform processing described later is stored in advance.

Also, the program storage section 7 has stored thereon a program for causing the control section 2 to perform AE (Auto Exposure) control, AF (Auto Focus) control, AWB (Auto White Balance) control, and the like, and various data, such as data constituting a program chart indicating a combination of shutter speed, ISO speed, and an aperture value that are used in AE control. Note that the AF control by the control section 2 is control using the so-called contrast detection method where the image sensor of the imaging section 4 is used as an AF sensor.

Moreover, the program storage section 7 has stored thereon a program for causing the control section 2 to perform image capture processing described later and mask data 101 that is used in the image capture processing. The mask data 101 is gray scale image data representing a first mask image M1 shown in FIG. 3A.

Figure 3B:
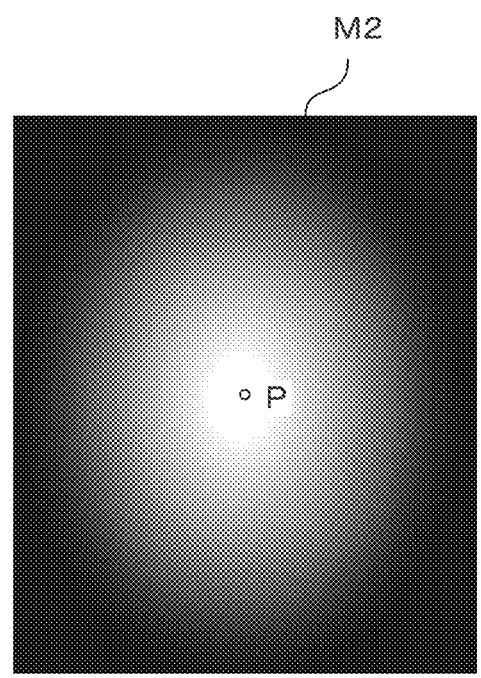
FIG. 3D is a diagram showing a second mask image.

This first mask image M1 corresponds to one of four images acquired by a second mask image M2 shown in FIG. 3B being divided into four images in the peripheral direction. The second mask image M2 is an image having an oval gradation area on a black background, in which the luminosity of each pixel is maximum at the center and gradually decreases toward the periphery.

Here, in the present embodiment, the second mask image 142 corresponds to basic information of the present invention which is used to generate a third mask image 143 described later, and the shape (oval shape) of the gradation area is a basic shape of a processing area where predetermined image processing in the present invention is performed. Also, change in the luminosity of each pixel in the gradation area indicates change in the strength of the predetermined image processing of the present invention, or more specifically, indicates the fact that the processing strength gradually increases toward the periphery side from the center side.

The face detection section 8 includes an image processing circuit that performs face detection processing for detecting the face portion of an arbitrary person from an image captured by the imaging section 4, a memory having stored thereon various types of data to be used for the face detection processing, a working memory for storage, and the like, and supplies area information indicating an area corresponding to the face portion to the control section 2.

The face detection processing by the face detection section 8 is well-known versatile processing in which eyes, a nose, and a mouth having a predetermined positional relationship are searched for by using an image recognition technique such as binarization, contour extraction, and pattern matching, and a rectangular area (hereinafter referred to as "face area") where they are present is identified and detected as a face portion.

The operation section 9 includes a plurality of operation switches, such as a power button, a shutter button, a mode change switch for switching between the imaging mode and the playback mode, a zoom lever, and a control button that is used for selecting and setting various functions. The operation statuses of the operation switches in the operation section 9 are continuously monitored by the control section 2.

The power supply section 10 includes a rechargeable battery, a DC/DC converter, and the like, and supplies electric power required for each operation to each section of the digital camera 1.

In the present embodiment, the digital camera 1 has a soft focus function as a function that can be used in the imaging mode. This soft focus function is a function by which predetermined processing including soft focus processing equivalent to conventional soft focus processing is automatically performed on an image acquired in image capturing and the processed image is stored as a definitive captured image.

In the imaging mode of the digital camera 1, when the soft focus function has been set by the user, the control section 2 performs image capture processing shown in the flowchart of FIG. 2 in accordance with the program stored in the program storage section 7.

That is, when the imaging mode is set the control section 2 starts the capturing of a photographic subject image by the imaging section 4 and live view display by the display section 5, enters an imaging standby state, and maintains this state until an instruction to perform imaging is given by the user (NO at Step SA1), as shown in FIG. 2. Note that, although not shown, the control section 2 in the imaging standby state performs AF control.

Then, when an instruction to perform imaging is given by the user (YES at Step SA1), the control section 2 performs normal development processing on the data of a captured image acquired by the imaging section 4 and thereby generates a normal developed image so that the image can be stored (Step SA2).

Subsequently, the control section 2 performs soft focus processing on the normal developed image generated as described above, and thereby generates a soft focus image, that is, a processed image to which a defocusing effect similar to that occurred due to the chromatic aberration and spherical aberration of a dedicated lens has been added (Step SA3). Note that this soft focus processing is processing using a well-known image processing technology including one or a plurality of processing steps.

Next, the control section 2 controls the face detection section 8 to perform face detection processing with the normal developed image as a processing target (Step SA4).

Here, when the face of an arbitrary person is not detected from the normal developed image by the face detection section 8 (NO at Step SA5), the control section 2 takes the soft focus image as a captured image, that is, a definitive image to be stored, performs compression processing and the addition of attribution information, and stores the image in the image storage section 6 as a still image file (Step SA6). Then, the control section 2 ends the image capture processing.

Conversely, when the face of an arbitrary person is detected from the normal developed image (YES at Step SA5), that is, when a normal developed image G1 such as that shown in FIG. 4 has been generated by the processing at Step SA2 and a soft focus image G2 such as that shown in FIG. 4 has been generated by the processing at Step SA3, the control section 2 performs the processing of Step SA7 and the following steps.

Here, the processing at Step SA7 and the following steps are briefly explained prior to the explanation of its concrete details. That is, the control section 2 generates the above-described second mask image 142 shown in FIG. 3B using the first mask image M1 shown in FIG. 3A, and generates the third mask image M3 shown in FIG. 4 using the second mask image M2. Note that the third mask image M3 is a gray scale image as with the first mask image M1, and its image size (number of pixels) is the same as that of the normal developed image G1.

Then, the control section 2 sets, for each pixel of the normal developed image G1, transparency based on the luminosity of each pixel of the third mask image 143, or in other words, a transparency level at which an image on a background side when the normal developed image G1 is superimposed thereon is shown through the normal developed image G1. Subsequently, the control section 2 combines the normal developed image G1 and the soft focus image G2 with the soft focus image G2 as a background, and thereby generates a composite image G3 shown in FIG. 4. That is, by well-known alpha blending, the normal developed image G1 and the soft focus image G2 that serves as a background are combined, whereby the composite image G3 is generated. Note that, in FIG. 4, an area (effect reduction area described later) corresponding to the gradation area of the third mask image M3 is indicated by an oval X shown with a broken line on the composite image G3 for descriptive purposes.

Figure 5A:
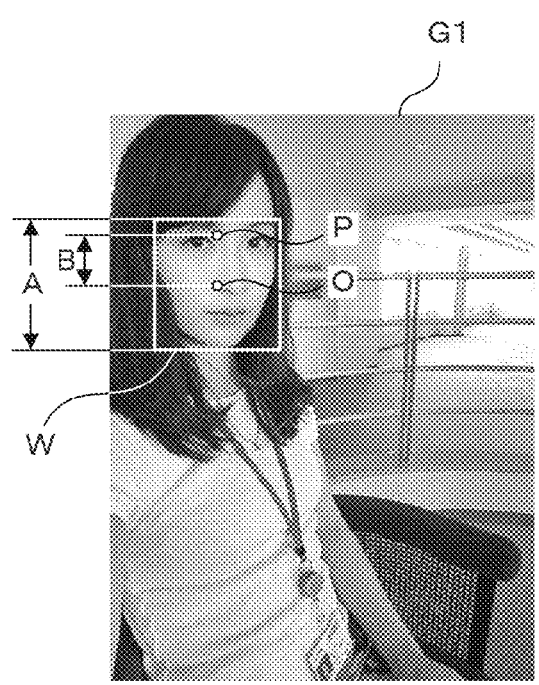
FIG. 5A and FIG. 5B are diagrams showing a method for generating a third mask image.

Hereafter, the processing at Step SA7 and the following steps is precisely described. First, the control section 2 acquires the center portion and the size of an image of the face area in the normal developed image G1 detected by the face detection section 8 (Step SA7). FIG. 5A is a diagram showing the normal developed image G1, the face area. W, and its center O. In the face processing at Step SA7, the control section 2 acquires the longitudinal size A of the face area W as the size of the face area W, and acquires the coordinates of the center O of the face area W as its position in the image.

Figure 5B:
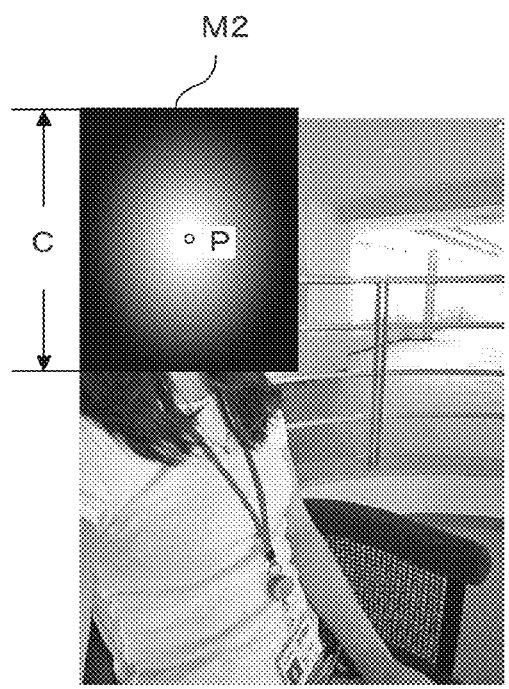

Next, the control section 2 calculates the size and the center portion of the second mask image M2 for the generation of the third mask image M3 shown in FIG. 4, based on the acquired data (the coordinates of the size A and the center O), (Step SA8). Here, the size of the second mask image M2 to be calculated is the longitudinal size C of a portion corresponding to the second mask image M2 in the third mask image M3 that is generated later, and the center portion is the coordinates of the center P of the second mask image M2 in the third mask image M3. In processing at Step SA8, the control section 2 multiplies the longitudinal size A of the face area W by a predetermined number, and thereby calculates the longitudinal size C. FIG. 5B shows an example where the predetermined number is 2.

Also, in the processing at Step SA8, the control section 2 calculates coordinates that are acquired by moving the coordinates of the center O of the face area W in the normal developed image G1 upward by a predetermined percentage (n %) of the longitudinal size A, as the coordinates of the center P of the second mask image M2 in the third mask image M3. For example, when the coordinates of the center of the face area W are (x0, y0), the movement amount B in the y-axis direction is A×n %, and the control section 2 acquires (x0, y0-B) as the coordinates of the center P of the second mask image M2. FIG. 5B is an example where the predetermined percentage is 40%.

Here, the above-described predetermined number and the predetermined percentage are values determined in consideration of the difference between the face area W identified by the face detection processing at Step SA4 and the actual face portion of the person excluding the hair portion in the normal developed image G1. Specifically, they are values determined based on an empirical rule.

Then, the control section 2 processes the first mask image M1 shown in FIG. 3A based on the calculated data (the longitudinal size C of the second mask image M2 and the coordinates of the center P), and thereby generates the third mask image M3 shown in FIG. 4 which is a mask image for image processing (Step SA9).

Specifically, the control section 2 first vertically and horizontally inverts the first mask image M1, and thereby generates three new mask images. Subsequently, the control section 2 connects them with the first mask image M1, and thereby generates the second mask image M2 shown in FIG. 3B. Next, the control section 2 enlarges the generated second mask image M2 such that its longitudinal size becomes equal to the above-described longitudinal size C, and performs smoothing processing on the enlarged second mask image M2 so as to ensure that the luminance value of each pixel changes smoothly.

Then, the control section 2 combines the smoothed second mask image M2 and a black image of a gray scale having the same pixel size as the normal developed image G1, with the black image as a background and with the center P being arranged at the coordinates calculated as described above, and then overwrites the second mask image M2, whereby the third mask image M3 is generated. Here, a surplus portion of the black image protruded into the area of the enlarged and smoothed second mask image M2 is trimmed.

After generating the third mask image M3, the control section 2 combines the normal developed image G1 and the soft focus image G2 by alpha blending using the third mask image M3, and thereby generates the composite image G3 (Step SA10).

Here, the control section 2 sets transmissivity according to the luminosity of each pixel of the third mask, image M3 for each pixel of the normal developed image G1 as described above. Specifically, the control section 2 sets, for each pixel of the normal developed image G1, a transmissivity of 0% to 100% according to the luminance value of a corresponding pixel of the third mask image M3. That is, when the luminosity of a corresponding pixel is high, a low transmissivity is set. Specifically, the control section 2 sets the lowest transmissivity (0%: completely opaque) for the pixel of the center P corresponding to the second mask image M2, sets transmissivity that gradually increases toward the periphery of the gradation area for other pixels, and sets the highest transmissivity (100%: completely transparent) for the other areas in the third mask image M3 excluding the gradation area.

Note that, when performing the alpha blending of the normal developed image G1 and the soft focus image G2, the RGB value of each pixel is calculated using an alpha value (1-0) according to the above-described transmissivity.

As a result, the composite image G3 is acquired in which a defocusing effect on the face portion of the person by the soft focus processing has been decreased as compared to the other portions while ensuring an image effect on the entire image by the soft focusing, and the level of the defocusing effect is gradually increasing from the center side toward the periphery side, or in other words, the reduction level of the defocusing effect is gradually decreasing toward the periphery, as shown in FIG. 4.

Then, the control section 2 performs compression processing and the addition of attribution information on the generated composite image G3 that is a definitive image to be stored, and stores it in the image storage section 6 as a still image file (Step SA11). Then, the control section 2 ends the image capture processing.

Thus, in the present embodiment, when a main photographic subject, that is, a target photographic subject is a person in image capturing using the soft focus function, the strength of the processing on the face portion of the person, that is, the defocusing effect on the face portion is suitably controlled regardless of the strength of the soft focus processing, whereby a captured image that is suitable as an image to be recorded can be acquired.

In addition, in the definitive captured image (composite image G3) acquired as the image to be recorded, the reduction level of the defocusing effect by the soft focus processing is gradually decreasing from substantially the center of the face portion of the person toward the periphery, and therefore a boundary between defocusing levels does not appear between the face portion of the person and the other areas, whereby a natural image effect can be ensured in the captured image.

Also, the position of the face area W acquired by the general-purpose face detection processing is determined as the position of the face portion of the person in the standard developed image G1. Accordingly, a processing load required to acquire the position is light.

Moreover, in the generation of the third mask image M3, the center P of the gradation area in the third mask image M3 is shifted to a position (the upper side in the present embodiment) different from the center O of the face area W as described above. Accordingly, even if a well-known technique is used in which the face of a person is detected based on its area, the position of the gradation area, that is, the position of the area where the defocusing effect by the soft focus processing is reduced (hereinafter referred to as "effect reduction area") coincides with the actual face portion of the person. As a result, a favorable captured image is acquired as a definitive captured image while reducing a processing load required to acquire the position of the face portion of the person.

Furthermore, in the generation of the third mask image M3, the second mask image M2 is enlarged in accordance with the size of the face area W, so that the effect reduction area (gradation area) is enlarged to have a size by which the face portion of the person is unfailingly covered. By this enlargement as well, a favorable captured image is acquired as a definitive captured image.

Still further, when a main photographic subject is an object other than a person such as scenery, a captured image (soft focus image) can be acquired on which an image effect has been given on the entire area by soft focusing as with conventional techniques.

Yet still further, the third mask image M3 is generated only when a main photographic subject is a person. Accordingly, when a main photographic subject is an object other than a person, unnecessary processing for generating the third mask image M3 can be omitted. On the other hand, the third mask image M3 is generated based on the first mask image M1 stored in advance. That is, since the basic shape that is basic information regarding the above-described effect reduction area and the change content of the reduction level of the processing effect are stored in advance as the first mask image M1, the processing required to generate the third mask image M3 can be reduced.

Also, since the first mask image M1 is equivalent to an image acquired by the second mask image M2 being divided into four images, the basic information regarding the third mask image M3 can be efficiently stored.

Here, the processing of the present embodiment has been described on the premise that the normal developed image G1 mainly includes only one face. However, in the generation of the third mask image M3 when the faces of a plurality of persons are present in the normal developed image G1, a plurality of effect reduction areas based on the position and size of each face are acquired. In this case, when there is an overlapping area where the effect reduction areas are overlapping with each other, the reduction level of the processing effect in the overlapping area is set to correspond to that of the effect reduction area having the highest reduction level.

Also, in the present embodiment, the position and the size of an effect reduction area to be set in the third mask image M3 are adjusted according to the position and the size of the face of a person (the size of the face area W). However, in addition to this, the shape of the effect reduction area may be adjusted according to the shape of the face. Specifically, the ellipticity of the effect reduction area (oval area) may be adjusted based on the ratio of the longitudinal size and the transverse size of the face area W, that is, based on whether the face is a slender face or a plump face. In this case, a more accurate effect reduction area can be acquired by the third mask image M3. Note that the difference of the faces of persons herein includes not only shape differences among individuals in literal terms but also shape differences due to differences of imaging directions.

Moreover, the present embodiment has been described on the premise that the direction of the face of a person and the direction of an image coincide with each other. However, in a case where a person lying down is imaged, the person may have turned his or her head to a side, and therefore the vertical direction of the face may not coincide with that of a captured image. Therefore, in the present invention, it is preferable that the orientation of the face of a person, that is, the rotation direction and the rotation amount of the face in an image is acquired in the above-described face detection processing, and the second mask image M2 is rotated based on the orientation of the face of the person when the third mask image M3 is generated. By this configuration as well, a more accurate effect reduction area can be acquired by the third mask image M3.

In the case where the shape and the orientation of an effect reduction area to be set in the third mask image M3 are adjusted based on the ratio of the longitudinal size and the transverse size of the face area W or the orientation of the face of a person, a plurality of mask images whose shapes and orientations of effect reduction areas are different from each other are stored in advance as the first mask image M1, and the third mask image M3 is generated by these masks being used selectively, whereby the processing required to generate the third mask image M3 can be reduced.

Figure 6:
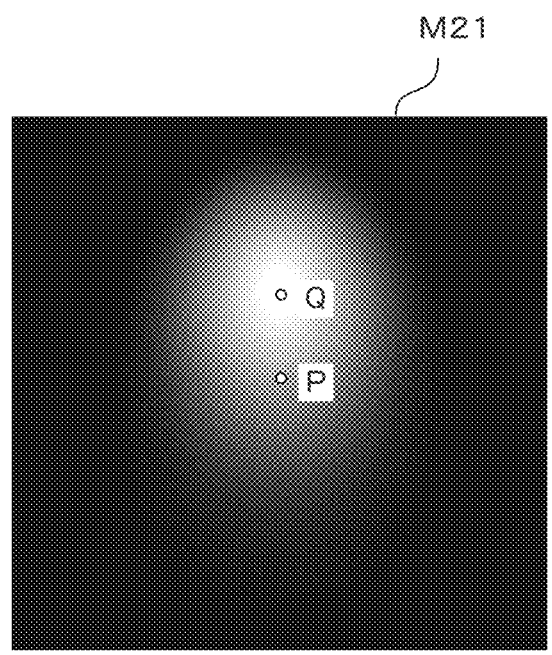
FIG. 6 is a diagram showing another form of a second mask image.

Furthermore, in the present embodiment, the second mask image M2 shown in FIG. 3B is used to generate the third mask image M3. However, the present invention is not limited thereto, and another mask image M21 having a gradation area in which the position Q of the pixel having the maximum luminance has been decentered within the oval area can be used to generate the third mask image M3, as shown in FIG. 6.

In this case as well, by the reduction level being changed to be gradually decreased from the center side toward the periphery side, a boundary between defocusing levels does not appear between the face portion and the other areas, whereby a natural image effect can be ensured in the captured image.

Also, in this case, in the generation of the third mask image M3, the above-described pixel position Q is arranged to be positioned at the center P of the second mask image M2 shown in FIG. 5B, whereby the effect reduction area can coincide with the actual face portion of the person. In addition, by using a mask image acquired by the above-described other mask M21 being divided horizontally in the diagram as the first mask image M1, the basic information regarding the third mask image M3 can be efficiently stored.

In the present embodiment, the shape of an effect reduction area to be set in the third mask image M3 is oval. However, the shape of this effect reduction area may be changed as necessary.

That is, the shape of the effect reduction area may be changed as necessary in accordance with a target photographic subject or an imaging mode for performing image capturing according to a target photographic subject. For example, when a target to be in the effect reduction area is an object other than the face of a person, such as when the target is an animal such as a cat, the shape may be wide oval. When the target is a flower, the shape may be true circle. When the target is a building, the shape may be rectangle.

Second Embodiment

Next, a second embodiment of the present invention is described. The second embodiment is different from the first embodiment in that a photographic subject focused on by AF control in image capturing is taken as a main photographic subject, that is, a target photographic subject. That is, in this embodiment, in the program storage section 7 of the digital camera 1 having the structure shown in FIG. 1, the following data and program have been stored in addition to the various data described above.

Specifically, in the program storage section 7 in this embodiment, a distance acquisition table has been stored which indicates a relation between an adjusted position of the lens group in the lens section 3 and a focusing distance (a distance to a focused photographic subject). Also, the program storage section 7 has stored thereon a program for causing the control section 2 to perform AF control by so-called continuous AF by which focusing is continuously performed on a relatively active photographic subject in an image, and a program for causing the control section 2 to perform image capture processing shown in FIG. 7 in the imaging mode when the soft focus function is set by the user.

Here, the difference between the image capturing processing in this embodiment and the image capturing processing in the first embodiment is described first. In the present embodiment the control section 2 does not perform face detection in image capturing. The control section 2 of the present embodiment generates the third mask image based on a distance to a photographic subject focused on by AF control (hereinafter referred to as "focusing distance") and a focal position, and then generates a definitive captured image (image to be recorded) using the third mask image.

Figure 7:
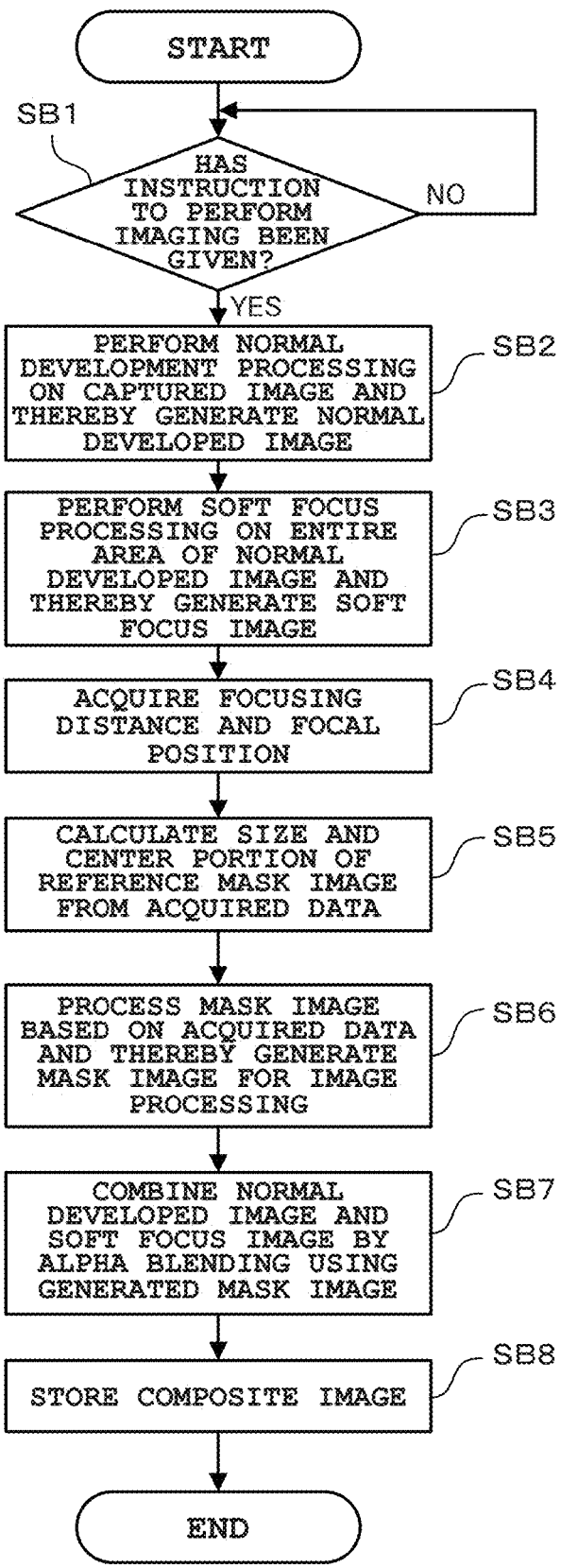
FIG. 7 is a flowchart of image capture processing in a second embodiment.

Next, the processing by the control section 2 of the present embodiment is precisely described using the flowchart in FIG. 7. As shown in the drawing, processing from Step S51 to Step S53 is the same as that of the first embodiment.

That is, when an instruction to start imaging is given by the user in an imaging standby state during which live view display and AF control are performed (YES at Step S51), the control section 2 controls the imaging section 4 to capture an image to be recorded, performs normal development processing on the data of the captured image, and generates a normal developed image (Step SB2). Subsequently, the control section 2 performs soft focus processing on the entire normal developed image generated as described above, and thereby generates a soft focus image (Step S53).

Next, the control section 2 acquires a focusing distance at the time of the imaging start instruction, and a focal position, that is, the coordinates of the focused area in the image (Step S54). Note that the focusing distance is acquired from the above-described distance acquisition table based on the adjusted position of the lens group at the time of the imaging start instruction.

Next, the control section 2 acquires the size and the center position of the second mask image M2 (refer to FIG. 5) that is a reference mask image, based on the acquired data (the focusing distance and the focal position) (Step SB5).

The size of the second mask image M2 to be acquired herein is equal to the longitudinal size of a portion of the third mask image (not shown) to be generated later which corresponds to the second mask image M2, as in the case of the first embodiment. Also, the longitudinal size to be acquired herein changes according to the focusing distance and the focal length of the lens section 3, or in other words, the zoom magnification. That is, this longitudinal size becomes smaller as the focusing distance becomes longer or the focal length of the lens section 3 becomes longer. The control section 2 parameterizes the focusing distance and the focal length of the lens section 3, and acquires the longitudinal size by calculation using a predetermined function by which the longitudinal size becomes smaller as the focusing distance becomes longer or the focal length of the lens section 3 becomes longer. That is the control section 2 adjusts the size of the portion of the third mask image corresponding to the second mask image M2 such that the size becomes smaller as the focusing distance becomes longer or the focal length of the lens section 3 becomes longer.

Then, the control section 2 processes the first mask image M1 shown in FIG. 3A based on the acquired data (the longitudinal size of the second mask image M2 and the focal position), and thereby generates the third mask image that is a mask image for image processing (Step SB6).

That is, after generating the second mask image M2 from the first mask image M1 as in the case of the first embodiment, the control section 2 enlarges the size thereof such that the longitudinal size becomes equal to the previously acquired longitudinal size, and performs smoothing processing on the enlarged second mask image M2. Then, the control section 2 combines the smoothed second mask image M2 and a black image of a gray scale having the same pixel size as the normal developed image, with the center P being arranged at the previously calculated focal position, and overwrites the second mask image M2, whereby the third mask image M3 is generated. Note that in this embodiment as well, a surplus portion of the black image protruded into the area of the enlarged image is trimmed, as shown in FIG. 5B.

Then, the control section 2 combines the soft focus image generated as Step SB3 and the normal developed image by alpha blending using the generated third mask image M3, and thereby generates a composite image (Step SB7). Note that the details of the processing are the same as that of the first embodiment.

As a result, the composite image is acquired in which a defocusing effect has not been exerted on the area of the photographic subject focused on at the time of the image capturing while ensuring an image effect on the entire image by the soft focusing.

Then, the control section 2 takes the generated composite image as a captured image (an image to be recorded), performs compression processing and the addition of attribution information thereon, and stores it in the image storage section 6 as a still image file (Step SB8). Then, the control section 2 ends the image capture processing.

Thus, in this embodiment as well, when a main photographic subject focused on by a photographer is a person in image capturing using the soft focus function, a captured image can be acquired in which a defocusing effect has not been exerted on the face portion of the person while ensuring an image effect on the entire image by the soft focusing. Also, when a main photographic subject is an object other than a person, a captured image can be acquired in which a defocusing effect has not been exerted on the photographic subject portion. That is, in the present embodiment as well, the strength of the processing on a main photographic subject can be suitably controlled regardless of the strength of the soft focus processing, whereby a favorable captured image can be acquired.

Also, in this embodiment as well, the second mask image M2 is an image having an oval gradation area, and the reduction level of an effect reduction area set in the third mask image M3 gradually decreases from substantially the center of a focused photographic subject portion toward the periphery. Therefore, a boundary between defocusing levels does not appear between the focused photographic subject portion and the other areas, whereby a natural image effect can be ensured in the captured image.

In addition, in the generation of the third mask image M3 in this embodiment, the size of the second mask image M2 is adjusted according to the focusing distance or the focal length of the lens section 3. Therefore, when the actual size of a main photographic subject (target photographic subject) can be assumed in advance, such as when a main photographic subject is the face of a person, a flower, or the like, the size of an effect reduction area to be set in the third mask image M3 can be adjusted to a suitable size without complicated photographic subject recognition processing.

In the image capture processing of the present embodiment, as a captured image, a composite image acquired by a soft focus image and a normal developed image being combined by alpha blending is always recorded. However, in a case where the digital camera 1 has, as a subordinate operation mode of the imaging mode, a specific imaging mode where imaging conditions and details of the above-described development processing are automatically set to be suitable for the image capturing of a specific target, such as a person imaging mode, the control section 2 may perform the following image capture processing.

In this case, in image capturing using the soft focus function, the control section 2 generates a soft focus image by the processing at Step SB3, and judges whether the current imaging mode is a specific imaging mode. Then, when the current imaging mode is a specific imaging mode, the control section 2 records, as a captured image, a composite image acquired by a normal developed image and the soft focus image being combined by alpha blending. Conversely, when the current imaging mode is not a specific imaging mode, the control section 2 performs processing for recording the generated soft focus image as it is as a captured image.

In the above-described case where a composite image acquired by combining a soft focus image and a normal developed image by alpha blending is recorded as a captured image only when the current imaging mode is a specific imaging mode, the actual size of a photographic subject can be assumed in advance based on the type of the current imaging mode. Therefore, in this case, the size of an effect reduction area to be set in the third mask image M3 can be unfailingly adjusted to a size suitable for the actual size of a photographic subject.

Moreover, in the second embodiment as well, the shape of an effect reduction area to be set in the third mask image M3 is oval. However, the shape of this effect reduction area can be changed as necessary, as in the case of the first embodiment.

In addition, when the digital camera 1 has, as subordinate operation modes of the imaging mode, imaging modes suitable for the image capturing of specific targets such as that described above, the shape of an effect reduction area may be set according to the type of an imaging mode. In this case, as the first mask image M1 representing a basic shape of an effect reduction area, a plurality of first mask images representing different basic shapes corresponding to the imaging modes are prepared in advance.

Furthermore, in the first and second embodiments described above, the first mask image M1 is stored in the program storage section 7 as mask information indicating a basic shape and the like of an effect reduction area to be set in the third mask image M3, and the second mask image M2 is generated from the first mask image M1. However, a configuration may be adopted in which the second mask image M2 is stored in the program storage section 7 as mask information indicating a basic shape and the like of an effect reduction area.

Still further, in the first and second embodiments, when a normal developed image acquired in image capturing and a soft focus image generated from the normal developed image are combined by alpha blending, the soft focus image serves as a background. However, in the present invention, a configuration may be adopted in which the normal developed image serves as a background. In this configuration, for example, an image where black and white are reversed is generated as the third mask image M3.

In either case, the normal developed image and the soft focus image are combined using the third mask image M3, that is, mask information regarding an effect reduction area where a defocusing effect by soft focus processing is reduced, whereby a final image is generated. As a result of this configuration, an intended final image can be easily generated by relatively simple image processing as compared to a case where a final image is directly generated by the effect being changed for each pixel of a normal developed image. In particular, in this configuration, since a normal developed image and a soft focus image are combined by alpha blending, an intended final image can be easily generated by exceedingly simple image processing.

Yet still further, in the first and second embodiments, the predetermined image processing which is performed on an image acquired in image capturing is soft focus processing for acquiring a defocusing effect by which a soft atmosphere is created by adding a blurring effect. However, the present invention can be applied to a case where the predetermined image processing is image processing other than the soft focus processing.

This image processing may be, for example, processing for adding a specific tone to an original image or adjusting the brightness of an original image, or processing for converting an original image to a painting-style image. Also, the effect of the predetermined image processing is not necessarily given to the entire area of an original image and may be given to a specific portion thereof, as with a crossing screen effect.

Yet still further, in the first and second embodiments, a new composite image is generated with a normal developed image acquired at the time of image capturing as an original image. However, the original image in the present invention may be any image as long as it is an image acquired by image capturing. For example, it may be a captured image already recorded on the image storage section 6.

In this case as well, the composite image G3 shown in FIG. 4 can be generated by processing similar to that of first embodiment. In addition, if the focal position, the focal distance, and the like at the time of the image capturing have been stored in a still image file as additional information for the captured image, a target photographic subject therein can be identified by the same method as that of the second embodiment.

Yet still further, the present invention can be applied in apparatuses other than the digital camera 1, which include digital photo frames that are used mainly for displaying an image captured by an arbitrary digital camera as an object to be viewed, general-purpose personal computers, and smartphones.

Yet still further, the original image in the present invention may be any image as long as it is an image acquired by image capturing, as described above. For example, it may be a captured image already subjected to arbitrary image processing, regardless of whether the present invention has been applied in a digital camera or in other apparatuses.

While the present invention has been described with reference to the preferred embodiments, it is intended that the invention be not limited by any of the details of the description therein but includes all the embodiments which fall within the scope of the appended claims.

What is claimed is:

1. An image processing apparatus comprising:
a storage; and
a CPU that is configured to:
acquire a position and a size of a target photographic subject in an original image acquired by image capturing;
generate mask information indicating a relation between (i) a position to be subjected to predetermined image processing in the original image and (ii) a strength of the predetermined image processing, based on the acquired position and the acquired size of the target photographic subject; and
generate a new image by performing predetermined image processing of a different strength on different positions in the original image by using the generated mask information;
wherein:
the storage stores basic information of the mask information,
the CPU generates the mask information by using the basic information stored in the storage,
the basic information stored in the storage includes a basic shape of a processing area that is subjected to the predetermined image processing, and
the basic information stored in the storage includes information regarding a change in the strength of the predetermined image processing in the processing area that is subjected to the predetermined image processing, the information regarding the change in the strength indicating that the strength is changed to be gradually increased from a center side to a periphery side.

2. An image processing apparatus comprising:
a CPU that is configured to:
acquire a position and a size of a target photographic subject in an original image acquired by image capturing;
generate mask information indicating a relation between (i) a position to be subjected to predetermined image processing in the original image and (ii) a strength of the predetermined image processing, based on the acquired position and the acquired size of the target photographic subject; and
generate a new image by performing predetermined image processing of a different strength on different positions in the original image by using the generated mask information;
wherein:
the CPU generates the new image by combining the original image and a processed image acquired by the predetermined image processing being performed on the original image, by using the generated mask information, and
the CPU generates, as the generated mask information, information indicating different transmissivities for different positions in the original image, and generates the new image by (i) setting, using the generated mask information, positions of one of the processed image and the original image to corresponding transmissivities indicated by the mask information and (ii) combining one of the processed image and the original image with the other one of the processed image and the original image.

3. An image processing method comprising:
- acquiring a position and a size of a target photographic subject in an original image acquired by image capturing;
- generating mask information indicating a relation between (i) a position to be subjected to predetermined image processing in the original image and (ii) a strength of the predetermined image processing, based on the acquired position and the acquired size of the target photographic subject; and
- generating a new image by performing predetermined image processing of a different strength on different positions in the original image by using the generated mask information,
- wherein the generating the mask information generates the mask information by using information regarding a basic shape of a processing area that is subjected to the predetermined image processing and information regarding a change in the strength of the predetermined image processing in the processing area that is subjected to the predetermined image processing, the information regarding the change in the strength indicating that the strength is changed to be gradually increased from a center side to a periphery side.

4. The image processing method according to claim 3, wherein the image capturing which acquires the original image from which the acquiring acquires the position and the size of the target photographic subject is performed by an imaging section.

5. The image processing method according to claim 3, further comprising identifying, as the target photographic subject, a photographic subject for which focal adjustment has been made and which is shown in the original image acquired by image capturing,
- wherein the acquiring acquires the position and the size of the target photographic subject in the original image, based on focal information of the identified photographic subject.

6. An image processing method comprising:
- acquiring a position and a size of a target photographic subject in an original image acquired by image capturing;
- generating mask information indicating a relation between (i) a position to be subjected to predetermined image processing in the original image and (ii) a strength of the predetermined image processing, based on the acquired position and the acquired size of the target photographic subject; and
- generating a new image by performing predetermined image processing of a different strength on different positions in the original image by using the generated mask information,
- wherein:
- the generating the mask information generates, as the generated mask information, information indicating different transmissivities for different positions in the original image, and
- the generating the new image generates the new image by (i) setting, using the generated mask information, positions of one of the processed image and the original image to corresponding transmissivities indicated by the generated mask information and (ii) combining one of the processed image and the original image with the other one of the processed image and the original image.

7. The image processing method according to claim 6, wherein the image capturing which acquires the original image from which the acquiring acquires the position and the size of the target photographic subject is performed by an imaging section.

8. The image processing method according to claim 6, further comprising identifying, as the target photographic subject, a photographic subject for which focal adjustment has been made and which is shown in the original image acquired by image capturing,
- wherein the acquiring acquires the position and the size of the target photographic subject in the original image, based on focal information of the identified photographic subject.

9. An image processing method comprising:
- detecting a target photographic subject in an original image acquired by image capturing, as an area with a predetermined shape in the original image;
- acquiring a position and a size of the detected target photographic subject area;
- generating a mask image indicating a relation between (i) a position to be subjected to predetermined image processing in the original image and (ii) a strength of the predetermined image processing, based on the acquired position and the acquired size of the detected target photographic subject area; and
- generating a new image by performing predetermined image processing of a different strength on different positions in the original image by using the generated mask image,
- wherein the generating the mask image generates the mask image centering on a position shifted from a center of the detected target photographic subject area.

10. The image processing method according to claim 9, wherein the image capturing which acquires the original image from which the acquiring acquires the position and the size of the target photographic subject is performed by an imaging section.

11. An image processing method comprising:
- acquiring a position and a size of a target photographic subject in an original image acquired by image capturing;
- generating mask information indicating a relation between (i) a position to be subjected to predetermined image processing in the original image and (ii) a strength of the predetermined image processing, based on the acquired position and the acquired size of the target photographic subject; and
- generating a new image by performing predetermined image processing of a different strength on different positions in the original image by using the generated mask information,
- wherein:
- the acquiring further acquires a rotation direction of the target photographic subject in the original image, and
- the generating the mask information generates the mask information in further consideration of the acquired rotation direction of the target photographic subject.

12. The image processing method according to claim 11, wherein the image capturing which acquires the original image from which the acquiring acquires the position and the size of the target photographic subject is performed by an imaging section.

* * * * *